3,548,531
RECEPTACLE FOR LIVE BAIT
John J. Holden, 3313 Liberty Parkway,
Baltimore, Md. 21222
Filed Apr. 4, 1969, Ser. No. 813,608
Int. Cl. A01k 73/02, 77/00
U.S. Cl. 43—9
5 Claims

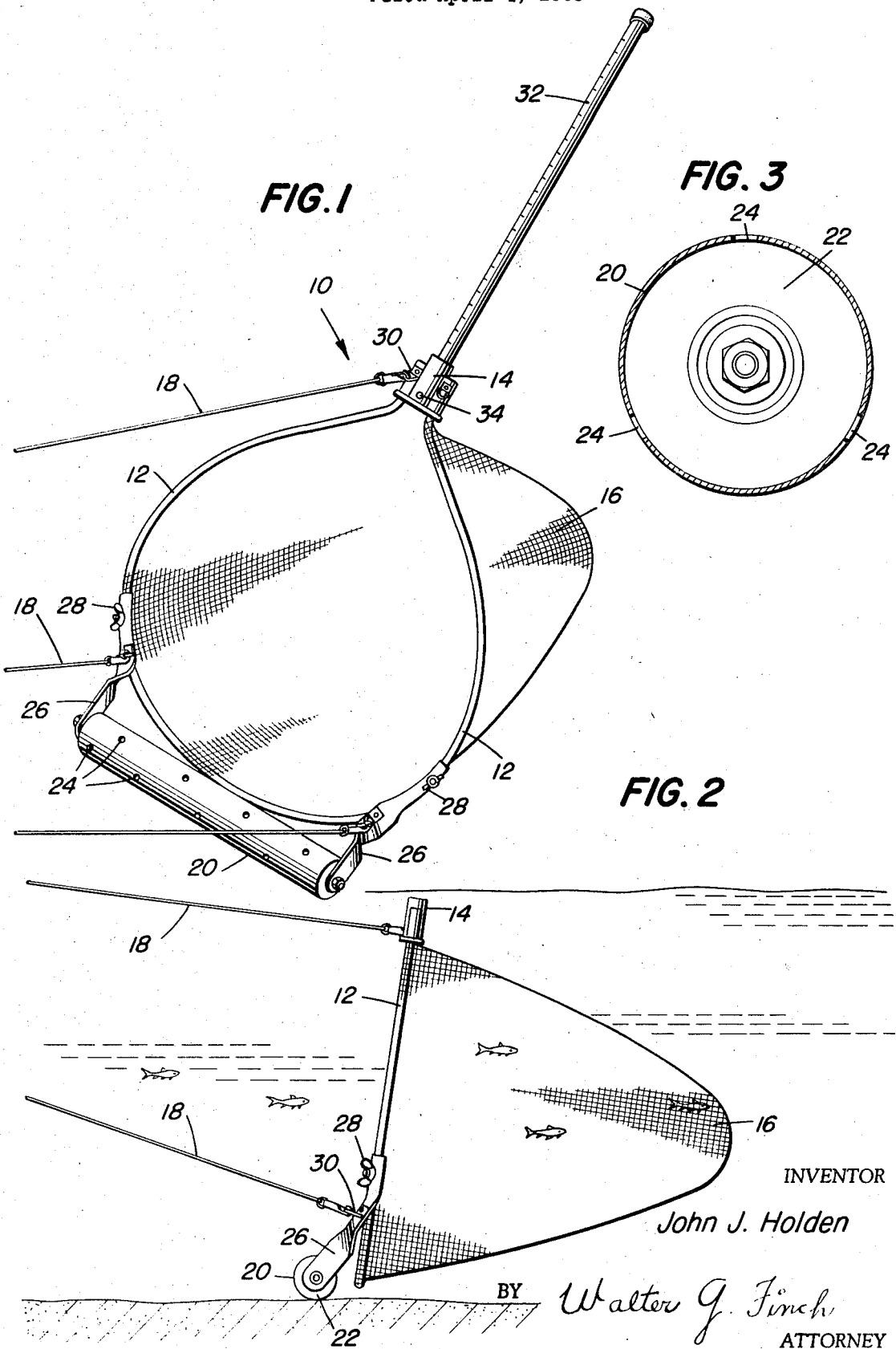

ABSTRACT OF THE DISCLOSURE

A dip net arrangement for use in catching live bait is provided which is convertible to trawling. The handle is removable from the dip net arrangement and provision is made for the attachment of tow ropes and a bottom contacting roller. The latter is hollow for weight relief and is floodable to cancel the buoyancy of the dip net arrangement.

---

This invention relates generally to fishing accessories, and more particularly it pertains to a net arrangement for capturing live bait using two modes of operation.

A dip net has long been used for live bait capturing by fishermen and so have trawl nets.

It is an object of this invention, therefore, to provide a net which is readily convertible from one of the above to the other.

Another object of this invention is to provide a trawl net frame arrangement which rolls along the water bed when towed and oriented so as to capture the live bait disturbed by the roller.

Still another object of this invention is to provide a dip net arrangement, having detachable roller and rope attachments, which can be converted from use as a dip net arrangement to a landing net or as a dip net to catch bait adjacent the surface of the water.

And even another object of the invention is to provide a dip net arrangement which can be used to catch bait swimming on or adjacent the surface of the water or which can be arranged to catch live seed or grass shrimp.

Other objects and attendant advantages of this invention will become more readily apparent and understood from the following detailed specification and single sheet of drawings in which:

FIG. 1 is a perspective view of a complete assembly of the combination dip net and trawler net having features of this invention;

FIG. 2 is a side elevation showing the arrangement of FIG. 1, handle removed, and functioning as a bottom trawler to capture live bait; and FIG. 3 is a cross section of the floodable roller for the net arrangement of FIGS. 1 and 2.

Referring now to the details of the invention as shown in the drawings, reference numeral 10 indicates generally a complete assembly of the live bait net arrangement. This arrangement 10 is generally in the form of a customary dip net having a rim 12 whose ends terminate in a rim and handle support 14. A small mesh net 16 is supported by this rim 12 so as to form a pouch, the open mouth of which is defined by the rim.

A roller 20 of light weight metallic tubing is provided with ends 22.

A plurality of apertures 24 make the roller 20 water permeable so as to cancel the buoyancy when immersed.

Each end 22 of the roller 20 is journalled to a bracket 26. These brackets 26 are removably attached to the rim 12, with wing nuts 28 and are formed so as to support the roller 20 slightly below and forward of the lowest point of the rim 12 when the latter is in a vertical plane.

Tow ropes 18 having hooks 30 are attachable to the roller brackets 26 and to the rim and handle support 14.

As shown best in FIG. 2, the roller 20 rides over the water bed functioning to lift the bottom edge of the rim 12 clear of an obstruction, and also to disturb the bottom inhabiting fish which swim into the net 16.

When the net arrangement 10 is to be used as a dip net, the roller 20 is removed with the brackets 26 and tow lines 18. A handle 32 is socketed in the support 14 which receives a spring detent 34 on the lower end thereof.

Obviously many modifications and variations of the present invention are possible in light of the above teachings. It is, therefore, to be understood that within the scope of the appended claims the invention may be practiced otherwise than as specifically described.

What is claimed is:

1. A dip net arrangement for use in catching live bait and which is convertible to trawling, comprising, a dip net, a rim and handle support for terminating said rim, a mesh net supported by said rim to form a pouch, with the open mouth of said net being defined by said rim, a handle positioned in said rim and handle support, means including a roller secured at its ends to said rim, and at least one tow rope detachably secured to said rim.

2. A dip net arrangement as recited in claim 1, wherein said roller is formed of tubing having a plurality of apertures provided therein to make said roller water permeable so as to cancel the buoyancy when immersed.

3. A dip net arrangement as recited in claim 1, wherein said means for securing said roller to said rim consists of brackets located at opposite ends of said roller removably attached to said rim and constructed so as to support said roller slightly below and forward of the lowest point of said rim when said rim is in a vertical plane.

4. A dip net arrangement as recited in claim 1, wherein a plurality of spaced tow ropes are detachably secured to said rim.

5. A dip net arrangement as recited in claim 1, and means for detachably securing said handle to said rim and handle support.

References Cited

UNITED STATES PATENTS

| 314,047 | 3/1885 | Moscopoulos | 43—9 |
| 3,394,483 | 7/1968 | Taglioli | 43—11 |

WARNER H. CAMP, Primary Examiner

U.S. Cl. X.R.

43—11